(12) United States Patent
Xu

(10) Patent No.: US 9,204,273 B2
(45) Date of Patent: Dec. 1, 2015

(54) METHOD AND SYSTEM FOR TRIGGER INFORMATION TRANSMISSION AND PROTOCOL CONVERSION

(71) Applicant: ZTE Corporation, Shenzhen, Guangdong (CN)

(72) Inventor: Hui Xu, Shenzhen (CN)

(*) Notice: Subject to any disclaimer, the term of this patent is extended or adjusted under 35 U.S.C. 154(b) by 0 days.

(21) Appl. No.: 14/407,684

(22) PCT Filed: May 20, 2013

(86) PCT No.: PCT/CN2013/075936
§ 371 (c)(1),
(2) Date: Dec. 12, 2014

(87) PCT Pub. No.: WO2013/189222
PCT Pub. Date: Dec. 27, 2013

(65) Prior Publication Data
US 2015/0172890 A1 Jun. 18, 2015

(30) Foreign Application Priority Data
Jun. 19, 2012 (CN) .......................... 2012 1 0203215

(51) Int. Cl.
*H04L 29/08* (2006.01)
*H04W 4/18* (2009.01)
(Continued)

(52) U.S. Cl.
CPC ................. *H04W 4/18* (2013.01); *H04L 67/12* (2013.01); *H04L 67/2823* (2013.01); *H04L 69/08* (2013.01); *H04W 4/005* (2013.01); *H04W 4/14* (2013.01); *H04W 8/04* (2013.01)

(58) Field of Classification Search
CPC ......... H04W 4/18; H04W 4/005; H04W 8/04; H04W 4/14; H04L 67/12; H04L 67/2823; H04L 69/08

USPC ........................................................ 455/414.4
See application file for complete search history.

(56) References Cited

U.S. PATENT DOCUMENTS

2012/0243422 A1 9/2012 Jokimies
2013/0308564 A1* 11/2013 Jain ...................... H04B 15/00
370/329
(Continued)

FOREIGN PATENT DOCUMENTS

CN 10235004 * 1/2012
CN 102325004 A 1/2012
(Continued)

OTHER PUBLICATIONS

International Search Report in international application No. PCT/CN2013/075936, mailed on Aug. 29, 2013.
(Continued)

*Primary Examiner* — Tanmay Shah
(74) *Attorney, Agent, or Firm* — Oppedahl Patent Law Firm LLC; Carl Oppedahl; Micah Gunn

(57) ABSTRACT

A method for trigger information transmission and protocol conversion is provides, and the method includes: an MTC-IWF which has received trigger information about an MTC device acquires routing information of the MTC device through a subscribed serving network element, the MTC-IWF transmits received trigger information about the MTC device to a serving core network node of the MTC device through an SMS core network node; the serving core network node of the MTC device transmits the trigger information to the MTC device; in the above process, the MTC-IWF or a dedicated IWF or an SMS router implements signaling conversion between an MAP protocol and a Diameter protocol. A system for trigger information transmission and protocol conversion is also provided for implementing above method. It is possible using the method and system to transmit trigger information through a T4 interface and establish a process of converting between an MAP protocol and a Diameter protocol.

20 Claims, 4 Drawing Sheets

(51) Int. Cl.
*H04W 4/14* (2009.01)
*H04L 29/06* (2006.01)
*H04W 4/00* (2009.01)
*H04W 8/04* (2009.01)

(56) References Cited

U.S. PATENT DOCUMENTS

2014/0089442 A1* 3/2014 Kim .................. H04W 76/02 709/206
2014/0219182 A1* 8/2014 Chandramouli ...... H04W 4/005 370/328

FOREIGN PATENT DOCUMENTS

| CN | 102427604 A | 4/2012 |
| GB | 2476415 A | 6/2011 |
| WO | 2012005440 A2 | 1/2012 |

OTHER PUBLICATIONS

English Translation of the Written Opinion of the International Search Authority in international application No. PCT/CN2013/075936, mailed on Aug. 29, 2013.
Supplementary European Search Report in European application No. 13806190.8, mailed on Apr. 21, 2015.
3GPP TS 23.682 V11.1.0 , Jun. 2012.

* cited by examiner

METHOD AND SYSTEM FOR TRIGGER INFORMATION TRANSMISSION AND PROTOCOL CONVERSION

TECHNICAL FIELD

The disclosure relates to wireless communication techniques, and in particular to a method and system for trigger information transmission and protocol conversion in a Machine Type Communication (MTC) system.

BACKGROUND

Machine to Machine (M2M) techniques refer to all techniques for establishing a connection between machines. The M2M concept arose in the 1990's but was only in its theoretical stage then. After 2000, as the development of mobile communication techniques, it becomes possible to realize networking of machines through mobile communication techniques. M2M services were launched into the market in about 2002 and developed rapidly thereafter, thus becoming a focus of attention of many communication equipment manufacturers and telecommunication operators. At present machines in the world are much more than people therein, thus it can be foreseen that M2M techniques will have good market prospects.

Studies on application scenarios of M2M communications show that there are huge market prospects in providing M2M communications using a mobile network. But M2M services make many new requirements on a communication system. Therefore, in order to make a mobile network more competitive in this regard, it is necessary to optimize an existing network so as to support M2M communications more efficiently.

An existing mobile communication network is designed mainly for communications among people, which is less optimized for communications between man and machine. In addition, how an operator can provide M2M communication services at a low cost is also critical to a successful deployment of M2M communications.

Based on above conditions, it is necessary to study technical solutions for a mobile network to support M2M communications so as to re-use existing networks to the greatest extent, thus decreasing influences caused by a large amount of M2M communications on a network and lowering the complexity of operation and maintenance.

Current competition in the telecommunication market becomes increasingly intense, profit margins for an operator become ever-shrinking with a continuous decrease in charges, and the people-oriented communication market is becoming saturated, thus M2M means a totally new opportunity for development to operators.

In order to efficiently use mobile network resources, the 3rd Generation Partnership Project (3GPP) proposes the Machine Type Communication (MTC), i.e., Machine to Machine (M2M) and machine to man communication services, with its service scope beyond that of existing Human to Human (H2H) communications, and the MTC differs greatly from an existing H2H communication model in aspects such as access control, charging, security, Quality of Service (QoS), service mode and the like.

In a 3GPP Evolved Packet System (EPS) architecture, the EPS includes a radio access network (such as a UTMS Universal Terrestrial Radio Access Network (UTRAN), an Evolved UTRAN (E-UTRAN), a GSM/EDGE Radio Access Network (GERAN)) and a core network, e.g., an Evolved Packet Core (EPC) including network elements such as a Mobility Management Entity (MME), a serving gateway, a Packet Data Network (PDN) Gateway (PGW) and the like, and a GPRS core including network elements such as a Serving GPRS Support Node (SGSN) and the like; the E-UTRAN includes an evolved Node B (eNB).

Triggering of an MTC device (also called MTC Device Trigger) is one of basic requirements on an MTC system, and a problem concerned by the requirement is that communications can be implemented by the way that an MTC server initiates a polling in order to control communications of an MTC device, and with respect to communications initiated by the MTC device, the MTC server may be desired at times to poll data from the MTC device. If the MTC server makes an unsuccessful query or an IP address of the MTC device is not available, the MTC server may establish communications with the MTC device through MTC device trigger. If a network cannot trigger the MTC device, the network reports to the MTC server an MTC device trigger failure, the MTC device trigger is implemented through control plane signaling in the 3GPP.

The MTC device trigger includes a Mobile Originated (MO) service and a Mobile Terminating (MT) service, i.e., including transmitting or receiving information by the MTC device.

In order to implement efficient transmission of an MTC device trigger request, the proposed solutions include transmitting trigger information about the MTC device through a Short Messaging Service (SMS), or transmitting the trigger information about the MTC device through control plane signaling or transmitting the trigger information about the MTC device through user plane data. For the way of transmitting the trigger information about the MTC device through control plane signaling, an MTC server transmits control plane signaling including the trigger information about the MTC device to an MTC Inter Working Function (MTC-IWF), the MTC-IWF chooses to transmit the trigger information through a T5 or T4 interface, and then transmits the trigger information about the MTC device to User Equipment (UE). For the way of transmitting the trigger information about the MTC device through user plane data, the MTC server transmits the trigger information about the MTC device to the MTC-IWF, the MTC-IWF acquires an IP address of the MTC device and transmits the trigger information to the MTC device through a user plane. FIG. 1 is a schematic diagram of an MTC architecture in the 3GPP according to the prior art, as shown in FIG. 1, in the user plane, an MTC application device connected to an MTC user communicates with an MTC server through an API, or communicates directly with a Gateway GPRS Support Node (GGSN)/PGW in a 3GPP network through a Gi/SGi interface; the MTC server communicates with the GGSN/PGW through a Gi/SGi interface; the GGSN/PGW communicates with UE through a Radio Access Network (RAN); in the control plane, an MTC server transmits control plane signaling including the trigger information about the MTC device to an MTC-IWF through a Tsp interface, and the MTC-IWF transmits the control plane signaling to an MME/SGSN/MSC (Mobile Switching Center) or SM-SC (Short Message Service Center) so as to be transmitted to the UE through the RAN.

A Mobile Application Part (MAP) protocol defines a signaling system and regulations of an application layer of a system of a 3GPP core network, and the MAP protocol provides a mobility service, an operation maintenance service, a call processing service, a supplementary services related service, an SMS management service, a Packet Data Protocol (PDP) context activation service for a network request and a management service for positioning services. The MAP protocol applies to interfaces between various functional entities of the core network, including C, D, E, F, G, J, Gc, Gd, Gf and Gr.

The Authentication, Authorization and Accounting (AAA) working group of the Internet Engineering Task Force (IETF) agrees to regard the Diameter protocol as a standard of an AAA protocol of next generation. The Diameter protocol (the upgraded version of the RADIUS protocol) includes Base protocols, a Network Access Service (NAS) protocol, an Extensible Authentication Protocol (EAP), a Mobile IP Protocol (MIP), a Cryptographic Message Syntax (CMS) protocol and the like. The Diameter protocol supports the authentication, authorization and accounting of a mobile IP, an NAS request and a mobility agent, and the Diameter protocol is implemented in a similar way as the Remote Authentication Dial In User Service (RADIUS), also implemented using an Attribute-Length-Value (AVP) triple and an attribute value pair (in the form of Attribute-Length-Value), but the Diameter protocol further specifies in detail an error processing mechanism, a failover mechanism, the use of a Transmission Control Protocol (TCP) and the support to distributed accounting, thus overcoming many drawbacks of the RADIUS and becoming an AAA protocol most suitable for future mobile communication systems.

In the 3GPP during a period when circuit switched services predominate (e.g., Global System of Mobile communication (GSM)), an interface of a core network generally uses the MAP protocol, and with the development of packet switching (e.g., Long Term Evolution (LTE)), an interface of a core network generally uses the Diameter protocol. For example, a Home Location Register (HLR) generally uses the MAP protocol while an MME generally uses the Diameter protocol, thus when the MME is connected to the HLR, it is needed to perform conversion between the MAP protocol and the Diameter protocol and an IWF is used to implement the protocol conversion. FIG. 2 is a schematic diagram showing inter-working of network elements of a mobile network through the IWF, as shown in FIG. 2, the IWF is in charge of protocol conversion between the MAP and the Diameter.

In the 3GPP, Tsp and S6m interfaces use the Diameter protocol and a T4 interface may also use the Diameter protocol, while the HLR may be deployed in an MTC architecture and generally uses the MAP protocol.

During the study and implementation of the prior art, it is found that there are problems left unsolved hitherto in the prior art, i.e., when an MTC-IWF transmits trigger information through a T4 interface, if an SMS related entity (such as SM-SC, GMSC, IWMSC, SMS Router) interworks with an HLR using the MAP protocol while an MME, Tsp and S6m interwork with each other using the Diameter protocol, it is not clear how to implement conversion between the MAP protocol and the Diameter protocol and which network entity is expected to perform the conversion during cooperative communication of above network elements, and if SMS in MME is supported, it is not clear which protocol will be used between network entities of an SMS core network.

SUMMARY

In view of the above, the disclosure is intended to provide a method and system for trigger information transmission and protocol conversion to implement transmission of trigger information about an MTC device by way of a short message and implement protocol conversion between various network elements.

To this end, the technical solutions of the disclosure are implemented as follows.

A method for trigger information transmission and protocol conversion includes that:
  an MTC-IWF which has received trigger information about an MTC device transmits a request for acquiring routing information of the MTC device to a subscribed serving network element;
  the subscribed serving network element returns information of a serving core network node of the MTC device to the MTC-IWF;
  the MTC-IWF forwards the trigger information about the MTC device to the serving core network node of the MTC device through an SMS core network node;
  the serving core network node of the MTC device transmits the trigger information to the MTC device; and
  the MTC-IWF and/or a dedicated IWF and/or an SMS router implement protocol conversion needed in above process.

In an embodiment, the SMS core network node may include a Short Message Service Center (SM-SC), a Short Messaging Service Gateway Mobile Switching Center (SMS GMSC), an SMS router;
  the serving core network node of the MTC device may include at least one of a Mobility Management Entity (MME), a Serving GPRS Support Node (SGSN) and a Mobile Switching Center (MSC); and
  the subscribed serving network element may be a Home Subscriber Server (HSS) or a Home Location Register (HLR).

In an embodiment, the method may further include that:
  when the subscribed serving network element is an HLR, a communication protocol used between the MTC-IWF/ dedicated IWF and the HLR is different from a communication protocol used between the MTC-IWF/dedicated IWF and the SMS core network node; the MTC-IWF or the dedicated IWF converts a communication protocol message of the HLR.

In an embodiment, the method may further include:
  when the subscribed serving network element is an HLR, a communication protocol used between the MTC-IWF/ dedicated IWF and the HLR is different from a communication protocol used between the MTC-IWF/dedicated IWF and an SCS; the MTC-IWF/dedicated IWF converts a communication protocol message of the HLR.

In an embodiment, the protocol conversion may refer to signaling conversion between an MAP protocol and a Diameter protocol.

In an embodiment, the SMS core network node may acquire the routing information of the MTC device through one of following ways:
  locally-stored routing information;
  receiving the routing information by the MTC-IWF;
  acquiring the routing information by the subscribed serving network element;
  wherein the acquiring the routing information by the subscribed serving network element may include:
  after receiving trigger information about the MTC device from a Serving Capability Server (SCS), the MTC-IWF forwards the trigger information about the MTC device to the SMS GMSC through the SM-SC;
  the SMS GMSC transmits a sendRoutingInfoForSM (SRI-for-SM) request message to the HSS or the HLR;
  the HSS or the HLR indicates "SMS in MME" to the SMS GMSC through an SRI-for-SM response message; or the HSS or the HLR forwards the SRI-for-SM request message to the SMS router, the SMS router then transmits the routing information of the MTC device to the HSS or the HLR through the SRI-for-SM response message, the HSS or the HLR then forwards the routing information of the MTC device to the SMS GMSC through the SRI-for-SM response message; or the HSS or the HLR notifies the SMS GMSC of the information of the serving core network node of the MTC device through the SRI-for-SM response message so as to indicate "SMS in MME".

In an embodiment, when the routing Information of the MTC device is acquired by the SMS router, and a communication protocol used between the SMS GMSC and the HSS or the HLR is different from a communication protocol used between the HSS or the HLR and the SMS router, the SMS router may implement conversion between MAP and Diameter of the HSS or the HLR.

In an embodiment, the indicating "SMS in MME" to the SMS GMSC through an SRI-for-SM response message may include that:
the SRI-for-SM response message includes at least information below: an MME number, MME, MME register as MSC for SMS, and PS-only.

In an embodiment, the transmitting the trigger information to the MTC device according to the routing information may include that:
the routing information is the information of the serving core network node of the MTC device; and
the SMS GMSC transmits the trigger information about the MTC device to the MTC device through a core network node by way of a short message according to the acquired routing information.

A system for trigger information transmission and protocol conversion includes an MTC-IWF, an MTC device, an SMS core network node, a serving core network node, an IWF and a subscribed serving network element, wherein
the MTC-IWF is configured to receive trigger information about the MTC device and transmit a request for acquiring routing information of the MTC device to the subscribed serving network element;
the subscribed serving network element is configured to return information of the serving core network node of the MTC device to the IWF;
the MTC-IWF is further configured to forward the trigger information about the MTC device to the serving core network node of the MTC device through the SMS core network node;
the serving core network node is configured to transmit the trigger information to the MTC device; and
the MTC-IWF and/or a dedicated IWF and/or an SMS router are configured to implement protocol conversion.

In an embodiment, the SMS core network node may include an SM-SC, an SMS GMSC, an SMS router;
the serving core network node of the MTC device may include at least one of an MME, a SGSN and an MSC; and
the subscribed serving network element may be an HSS or an HLR.

In an embodiment, when the subscribed serving network element is an HLR, a communication protocol used between the MTC-IWF/dedicated IWF and the HLR is different from a communication protocol used between the MTC-IWF/dedicated IWF and the SMS core network node; the MTC-IWF or the dedicated IWF may be further configured to convert a communication protocol message of the HLR.

In an embodiment, when the subscribed serving network element is an HLR, a communication protocol used between the MTC-IWF/dedicated IWF and the HLR is different from a communication protocol used between the MTC-IWF/dedicated IWF and the SCS; the MTC-IWF or dedicated IWF may be further configured to convert a communication protocol message of the HLR.

In an embodiment, the protocol conversion may refer to signaling conversion between an MAP protocol and a Diameter protocol.

In an embodiment, the SMS core network node may acquire the routing information of the MTC device through one of following ways:
locally-stored routing information;
receiving the routing information by the MTC-IWF;
acquiring the routing information by the subscribed serving network element;
wherein the acquiring the routing information by the subscribed serving network element may include:
after receiving trigger information about the MTC device from a Serving Capability Server (SCS), the MTC-IWF forwards the trigger information about the MTC device to the SMS GMSC through the SM-SC;
the SMS GMSC transmits a sendRoutingInfoForSM (SRI-for-SM) request message to the HSS or the HLR;
the HSS or the HLR indicates "SMS in MME" to the SMS GMSC through an SRI-for-SM response message; or the HSS or the HLR forwards the SRI-for-SM request message to the SMS router, the SMS router then transmits the routing information of the MTC device to the HSS or the HLR through the SRI-for-SM response message, the HSS or the HLR then forwards the routing information of the MTC device to the SMS GMSC through the SRI-for-SM response message; or the HSS or the HLR notifies the SMS GMSC of the information of the serving core network node of the MTC device through the SRI-for-SM response message so as to indicate "SMS in MME".

In an embodiment, when the HSS or the HLR acquires the routing Information of the MTC device through the SMS router, and a communication protocol used between the SMS GMSC and the HSS or the HLR is different from a communication protocol used between the HSS or the HLR and the SMS router, the SMS router may be further configured to implement signaling conversion between MAP and Diameter of the HSS or the HLR.

In the disclosure, after receiving trigger information about an MTC device, an MTC-IWF transmits a request for acquiring routing information of the MTC device to a subscribed serving network element; the subscribed serving network element returns information of a serving core network node of the MTC device to the MTC-IWF; the MTC-IWF forwards the trigger information about the MTC device to the serving core network node of the MTC device through an SMS core network node; the serving core network node of the MTC device transmits the trigger information to the MTC device. Specifically, the SMS core network node includes an SM-SC, an SMS GMSC, an SMS router; the serving core network node of the MTC device includes at least one of an MME, a SGSN or an MSC; and the subscribed serving network element is an HSS or an HLR. The MTC-IWF or a dedicated IWF can implement conversion of an MAP protocol and a Diameter protocol between the HLR and other network entities supporting the Diameter protocol; when a network supports the "SMS in MME" function, interfaces between entities of a core network related to the SMS use the Diameter protocol; when an SMS router is deployed in a system, the SMS router can also implement conversion between the MAP protocol and the Diameter protocol. Technical solutions of the disclosure make it possible to implement transmission of trigger information through a T4 interface and establish a process of conversion between an MAP protocol and a Diameter protocol.

DETAILED DESCRIPTION

In order to make objectives, technical solutions and advantages of the disclosure more clear, the disclosure will be further elaborated below in combination with the accompanying drawings and embodiments.

Figure 1:
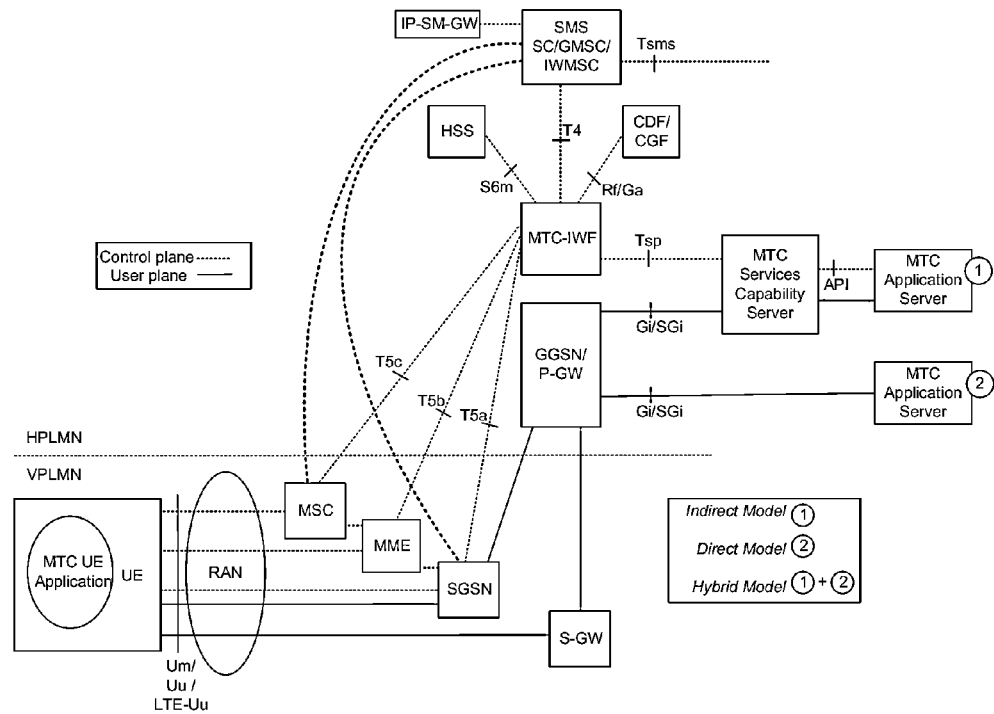
FIG. 1 is a schematic diagram of an MTC architecture in the 3GGP according to the prior art.
Figure 2:
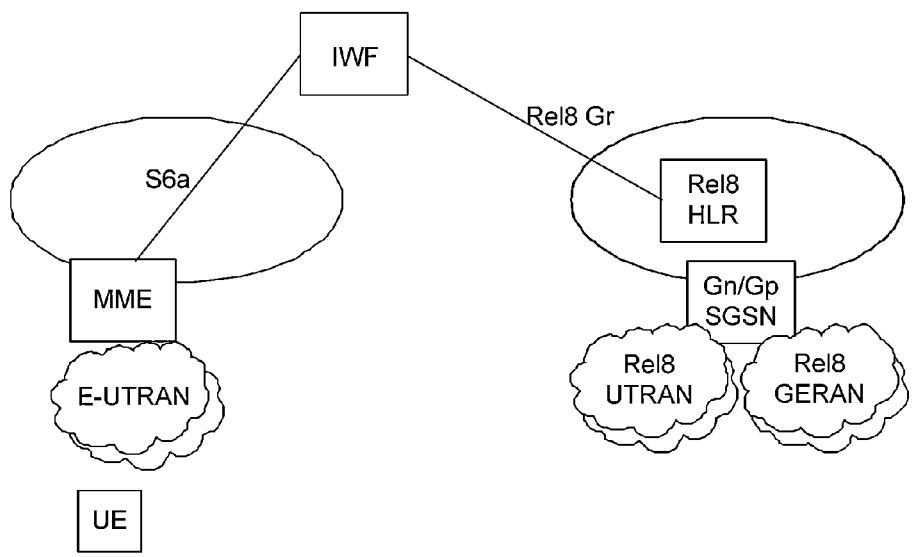
FIG. 2 is a schematic diagram of inter-working through an IWF according to the prior art.
Figure 3:
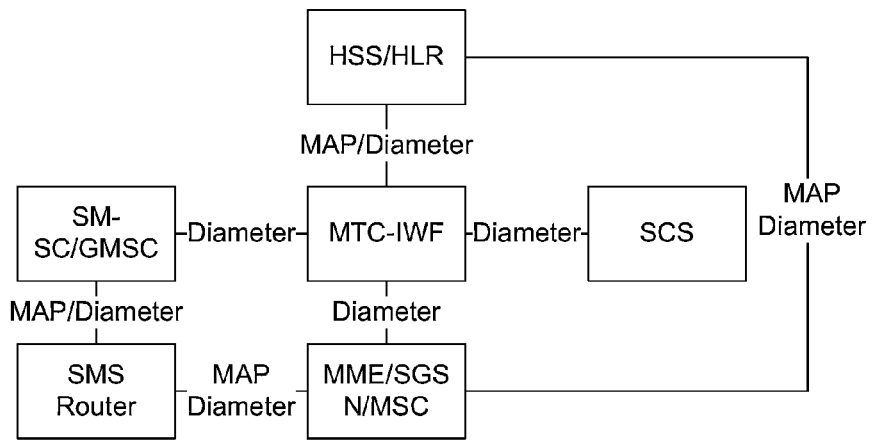
FIG. 3 is a schematic structural diagram of a system for trigger information transmission and protocol conversion according to the disclosure.

FIG. 3 is a schematic structural diagram of a system for trigger information transmission and protocol conversion according to the disclosure, as shown in FIG. 3, the system for trigger information transmission according to the disclosure includes an MTC device, an SMS core network node, a serving core network node, an MTC-IWF and a subscribed serving network element, wherein the MTC-IWF is configured to receive trigger information about the MTC device and transmit to the subscribed serving network element a request for acquiring routing information of the MTC device;

the subscribed serving network element is configured to return information of the serving core network node of the MTC device to the MTC-IWF;

the MTC-IWF is further configured to forward the trigger information about the MTC device to the serving core network node of the MTC device through the SMS core network node;

the serving core network node is configured to transmit the trigger information to the MTC device; and the MTC-IWF and/or dedicated IWF and/or SMS router are configured to implement protocol conversion.

In an embodiment, the SMS core network node includes an SM-SC, an SMS GMSC, an SMS router;

the serving core network node of the MTC device includes at least one of an MME, a SGSN and an MSC; and the subscribed serving network element is an HSS or an HLR.

In an embodiment, when the subscribed serving network element is an HLR, a communication protocol used between the MTC-IWF/dedicated IWF and the HLR is different from a communication protocol used between the MTC-IWF/dedicated IWF and the SMS core network node; the MTC-IWF or the dedicated IWF is further configured to convert a communication protocol message of the HLR.

In an embodiment, when the subscribed serving network element is an HLR, a communication protocol used between the MTC-IWF/dedicated IWF and the HLR is different from a communication protocol used between the MTC-IWF/dedicated IWF and the SCS; the MTC-IWF or dedicated IWF is further configured to convert a communication protocol message of the HLR.

In an embodiment, the protocol conversion refers to conversion of signaling between an MAP protocol and a Diameter protocol.

In an embodiment, the SMS core network node acquires the routing information of the MTC device through one of:
  locally-stored routing information;
  receiving the routing information by the MTC-IWF;
  acquiring the routing information by the subscribed serving network element;
  wherein the acquiring the routing information through the subscribed serving network element, includes:
  after receiving trigger information about the MTC device transmitted by a Serving Capability Server (SCS), the MTC-IWF forwards the trigger information about the MTC device to the SMS GMSC through the SM-SC;
  the SMS GMSC transmits to the HSS or the HLR a sendRoutingInfoForSM (SRI-for-SM) request message;
  the HSS or the HLR indicates "SMS in MME" to the SMS GMSC through an SRI-for-SM response message; or the HSS or the HLR forwards the SRI-for-SM request message to the SMS router, the SMS router transmits the routing information of the MTC device to the HSS or the HLR through the SRI-for-SM response message, the HSS or the HLR forwards the routing information of the MTC device to the SMS GMSC through the SRI-for-SM response message; or the HSS or the HLR notifies the SMS GMSC of the information of the serving core network node of the MTC device through the SRI-for-SM response message so as to indicate "SMS in MME".

In an embodiment, when the HSS or the HLR acquires the routing Information of the MTC device through the SMS router, and a communication protocol used between the SMS GMSC and the HSS or the HLR is different from a communication protocol used between the HSS or the HLR and the SMS router, the SMS router is further configured to implement signaling conversion between MAP and Diameter of the HSS or the HLR.

In the disclosure, communication protocols used between the MTC-IWF and the SCS, between the MTC-IWF and the SM-SC and between the SM-SC and the SMS GMSC are all a Diameter protocol. A communication protocol used between the SMS GMSC and the SMS router is an MAP/Diameter protocol. A communication protocol used between the SMS router and a serving node such as an MME/SGSN/MSC where the MTC device is located is an MAP protocol. A communication protocol used between the MMS/SGSN/MSC and the HSS/HLR is an MAP protocol.

In the disclosure, the indicating "SMS in MME" to the SMS GMSC through the SRI-for-SM response message includes that the SRI-for-SM response message includes at least information below: an MME number, MME register as MSC for SMS, and Packet Switch (PS)-only.

The above routing information is the information of the serving core network node of the MTC device; and
  the SMS GMSC transmits the trigger information about the MTC device to the MTC device through a core network node by way of a short message according to acquired routing information.

How various network elements transmit trigger information about an MTC device and how protocol conversion and information interaction are implemented between various network elements are elaborated below. In the disclosure, the protocol conversion function implemented by an MTC-IWF may also be implemented by a dedicated IWF although description below is made only taking the case of MTC-IWF as an example, it should be appreciated by those skilled in the art that the MTC-IWF can be replaced by a dedicated IWF.

Figure 4:
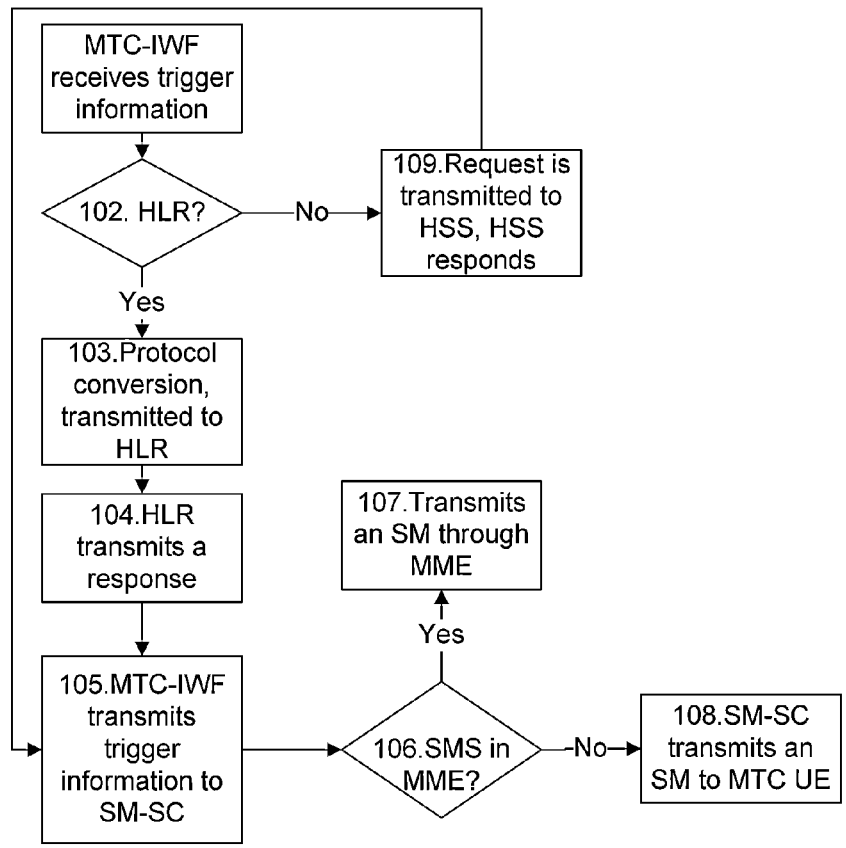
FIG. 4 is a flow chart of a method for trigger information transmission and protocol conversion according to the disclosure.

FIG. 4 is a flow chart of a method for trigger information transmission and protocol conversion according to the disclosure, as shown in FIG. 4, the method for trigger information transmission and protocol conversion according to the disclosure includes the following steps.

Step 101, an MTC-IWF receives trigger request information from a Service Capability Server (SCS).

The SCS transmits trigger information to the MTC-IWF through a Tsp interface;
after receiving trigger information about an MTC device from the SCS, the MTC-IWF authenticates and authorizes the SCS; if the SCS is valid, the MTC-IWF receives the trigger information, otherwise the MTC-IWF discards the trigger information.

Step 102, it is determined whether a home location of the trigger information is at an HLR, if at an HLR, proceed to step 103; otherwise proceed to step 109.

The MTC-IWF and the HLR are both located in an HPLMN; the MTC-IWF interworks with the HLR using an MAP protocol.

Step 103, the MTC-IWF maps received Diameter data into MAP data and transmits a user information request to the HLR.

The Diameter data received by the MTC-IWF refer to data received by the MTC-IWF through a Tsp interface from the SCS, wherein the Tsp interface uses a Diameter protocol.

The MTC-IWF is in charge of mapping Diameter data into MAP data and transmitting converted MAP data to the HLR, wherein the transmitted MAP data include information such as an external identifier or Mobile Station International Subscriber Directory Number (MSISDN) of an MTC device, an SCS identifier and the like. It should be noted that the MTC-IWF can determine above identifier information of the MTC device and SCS according to the received trigger information.

Step 104, the HLR transmits to the MTC-IWF a user information response.

The user information response includes whether the SCS is permitted to transmit the trigger information to the MTC device, an internal identifier of the MTC device, an identifier of a serving node of the MTC device; specifically, the internal identifier of the MTC device is an IMSI, and the serving node of the MTC device includes an MME, an SGSN and an MSC.

Step 105, the MTC-IWF chooses to transmit the trigger information to the SM-SC through a T4 interface.

The MTC-IWF selects an appropriate SM-SC according to configuration information so as to transmit the trigger information to the SM-SC, and the T4 interface between the MTC-IWF and the SM-SC may use a Diameter protocol or a Short Message Peer to Peer (SMPP) protocol.

The SM-SC forwards the trigger information to the SMS GMSC/IWMSC, and the SMS GMSC/IWMSC transmits to the HLR a request message for routing information of the MTC device.

The HLR returns the routing information of the MTC device to the SM-SC through the SMS GMSC/IWMSC.

Step 106, the HLR determines whether "SMS in MME" is supported, if supported, proceed to step 107; otherwise proceed to step 108.

The supporting "SMS in MME" refers to meeting conditions below: there is indication information in the HLR, including an MME number, MME register MSC for SMS, and PS-only; specifically, the MME number refers to an ISDN number, and the PS-only includes PS-only-enabled and PS-only-enforced.

Step 107, the SM-SC transmits the trigger information to the MTC device through the MME, and the process ends.
the trigger information is transmitted by the SM-SC through the MME, wherein the SM-SC inquires the HLR about the routing information through the MAP protocol, and the SM-SC transmits the trigger information to the MME through the Diameter protocol.

If an SMS router exists, the SM-SC transmits to the HLR a request message for routing information of the MTC device through an SMS GMSC/IWMSC, the HLR acquires from the SMS router the routing information of the MTC device and then returns to the SM-SC the routing information of the MTC device through the SMS GMSC/IWMSC. Here the SMS router can implement conversion between the MAP protocol and the Diameter protocol. Specifically, step 108 is implemented.

Step 108, the SM-SC transmits the trigger information to the MTC device according to received trigger information indication, and the process ends.

The trigger information indication refers to an identifier of a serving node of the MTC device and does not support "SMS in MME".

If the serving node is an MME, then the SM-SC transmits the trigger information to the MME through an E interface, and the MME transmits the trigger information through an SGs interface.

Step 109, the MTC-IWF transmits a user information request to a Home Subscriber Server (HSS), and the HSS transmits to the MTC-IWF a user information response; step 105 is then executed to repeat the above T4 triggering process.

The MTC-IWF and the HSS are located in a Home Public Land Mobile Network (HPLMN), and a Diameter protocol is used between the MTC-IWF and the HSS.

It should be noted that when the HLR is replaced by an HSS, the implemented processing involving the HSS is nearly the same as the process involving the HLR, thus the process after step 109 will not be repeated herein.

The implementation process and principle of the method according to the disclosure will be further elaborated below with reference to specific embodiments.

Embodiment 1

Figure 5:
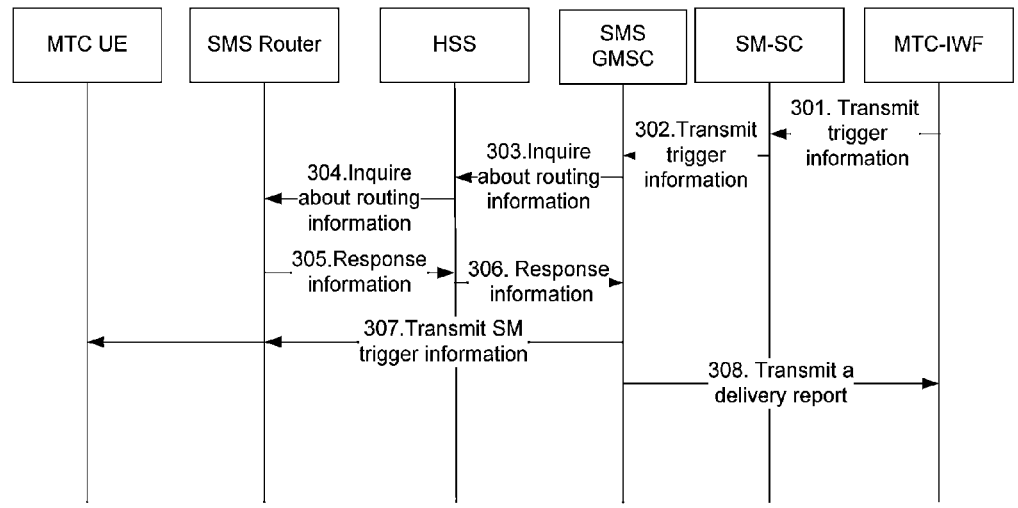
FIG. 5 is a flow chart of a method for trigger information transmission and protocol conversion according to embodiment 1 of the disclosure.

This embodiment is for a method for trigger information transmission in a scenario where an SMS router and an HSS are deployed. FIG. 5 is a flow chart of a method for trigger information transmission and protocol conversion according to embodiment 1 of the disclosure, as shown in FIG. 5, the method for trigger information transmission and protocol conversion according to the example includes steps below.

Step 301, an MTC-IWF transmits trigger information to the SM-SC.

After receiving trigger information about an MTC device from an SCS, the MTC-IWF forwards the trigger information to the SM-SC. The MTC-IWF transmits the trigger information to the SM-SC through a T4 interface, wherein the T4 interface supports a Diameter protocol or an SMPP.

Step 302, the SM-SC transmits SM trigger information to an SMS GMSC.

A Diameter protocol is used between the SM-SC and the SMS GMSC (Gateway Mobile Switching Center);

It should be noted that the SMS GMSC herein may also be an InterWorking Mobile Switching Center (IWMSC), for example, in an MO SMS, an MME/SGSN/MSC transmits a short message to the IWMSC.

Step 303, the SMS GMSC transmits an SRI-for-SM (SendRoutingInfo-for-ShortMessage) request message to an HSS.

An MAP or Diameter protocol is used between the SMS GMSC and the HSS to transmit the SRI-for-SM request message.

Step 304, the HSS forwards the SRI-for-SM request message to an SMS router.

A Diameter protocol is used between the HSS and the SMS router to transmit the SRI-for-SM request message; if in step 303 an MAP protocol is used between the SMS GMSC and the HSS, the SMS router is in charge of conversion between the MAP protocol and the Diameter protocol.

Step 305, the SMS router transmits an SRI-for-SM response message to the HSS.

A Diameter protocol is used between the HSS and the SMS router to transmit the SRI-for-SM response message;

the SRI-for-SM response message includes information of a serving node (such as an MME/SGSN/MSC) where a target MTC device is located.

Step 306, the HSS forwards the SRI-for-SM response message to the SMS GMSC.

An MAP or Diameter protocol is used between the SMS GMSC and the HSS to transmit the SRI-for-SM response message.

Step 307, the SMS GMSC transmits SM trigger information to the MTC device through the SMS router.

The SMS GMSC transmits the SM trigger information to the MTC device through the SMS router and a serving node.

Step 308, the SMS GMSC transmits a trigger information delivery report to the MTC-IWF through the SM-SC.

The delivery report indicates a success or failure of the transmission of the trigger information, if the transmission is failed, failure causes will be specified in the report.

Embodiment 2

Figure 6:
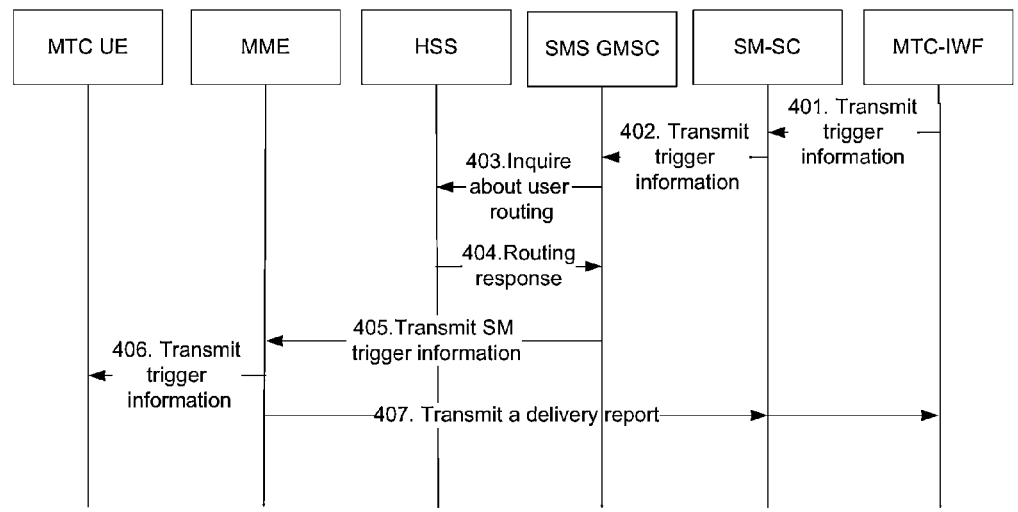
FIG. 6 is a flow chart of a method for trigger information transmission and protocol conversion according to embodiment 2 of the disclosure.

This embodiment is for a method for trigger information transmission in a scenario where "SMS in MME" is supported by a network. FIG. 6 is a flow chart of a method for trigger information transmission and protocol conversion according to embodiment 2 of the disclosure, as shown in FIG. 6, the method for trigger information transmission and protocol conversion according to the example includes steps below.

Step 401, an MTC-IWF transmits trigger information to the SM-SC.

This step is the same as step 301, and details thereof will not be repeated.

Step 402, the SM-SC transmits SM trigger information to an SMS GMSC.

This step is the same as step 302, and details thereof will not be repeated.

Step 403, the SMS GMSC transmits an SRI-for-SM request message to an HSS.

A Diameter protocol is used between the SMS GMSC and the HSS to transmit the SRI-for-SM request message.

Step 404, the HSS transmits an SRI-for-SM response message to the SMS GMSC.

A Diameter protocol is used between the SMS GMSC and the HSS to transmit the SRI-for-SM response message;

the response message indicates "SMS in MME", i.e., includes the following information: an MME number, MME register as MSC for SMS, and PS-only.

Step 405, the SMS GMSC transmits SM trigger information about an MTC device to the MME.

A Diameter protocol is used between the SMS GMSC and the MME to transmit the SM trigger information;

Step 406, the MME transmits the SM trigger information to the MTC device.

The MME transmits the trigger information to a target MTC device through a PS domain.

Step 407, the MME transmits a trigger information delivery report to the MTC-IWF through the SM-SC.

The delivery report indicates a success or failure of the transmission of the trigger information, if the transmission is failed, failure causes will be specified in the report.

Embodiment 3

Figure 7:
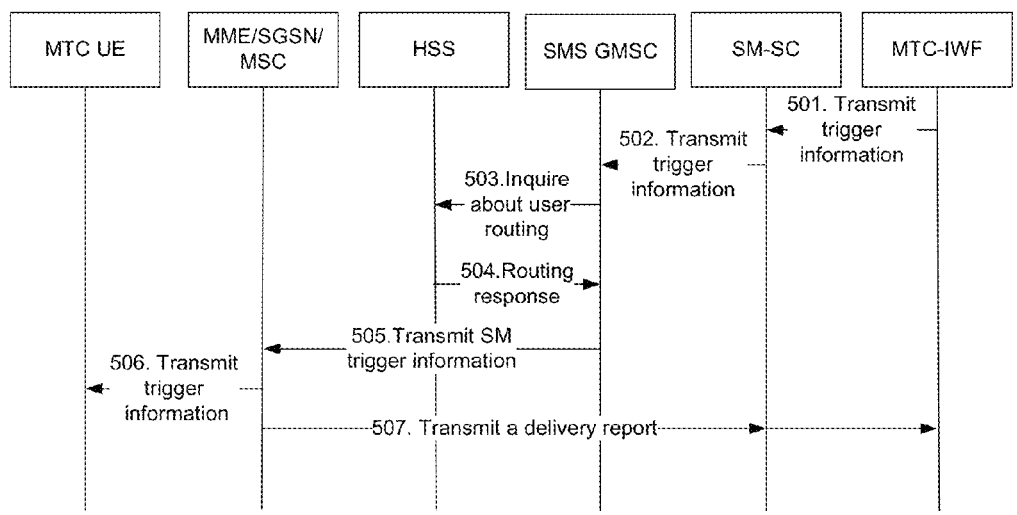
FIG. 7 is a flow chart of a method for trigger information transmission and protocol conversion according to embodiment 3 of the disclosure.

This embodiment is for a method for trigger information transmission in a scenario where "SMS in MME" is not supported by a network. FIG. 7 is a flow chart of a method for trigger information transmission and protocol conversion according to embodiment 3 of the disclosure, as shown in FIG. 7, the method for trigger information transmission and protocol conversion according to the example includes steps below.

Step 501, an MTC-IWF transmits trigger information to the SM-SC.

This step is the same as step 301, and details thereof will not be repeated.

Step 502, the SM-SC transmits SM trigger information to an SMS GMSC.

This step is the same as step 302, and details thereof will not be repeated.

Step 503, the SMS GMSC transmits an SRI-for-SM request message to an HSS.

This step is the same as step 303, and details thereof will not be repeated.

Step 504, the HSS transmits an SRI-for-SM response message to the SMS GMSC.

An Diameter protocol is used between the HSS and the SMS GMSC; the response message includes an identifier of a serving node (such as an MME/SGSN/MSC) where a target MTC device is located.

It should be noted that when the serving node of the MTC device is an MME, then it can be known from subscription information of the HSS that "SMS in MME" is not supported, for example an MME number is not registered, or there is no indication of "MME register as MSC for SMS" or indication of PS-only.

Step 505, the SMS GMSC transmits SM trigger information about an MTC device to the MME/SGSN/MSC.

An MAP or Diameter protocol is used between the SMS GMSC and the MME/SGSN/MSC; if the serving node is an MME, the short message is further transmitted to the SMC through an SGs interface and then transmitted to the target MTC device, or if an IMS is deployed in the network, the SM trigger information is transmitted through an IP-SM-GW.

The SMS GMSC transmits the trigger information to a corresponding serving node according to the identifier of the serving node acquired in step 504.

Step 506, the MME/SGSN/MSC transmits the SM trigger information to the MTC device.

The MME/SGSN/MSC transmits the trigger information to the target MTC device through a CS domain or PS domain (if an IMS is deployed).

Step 507, the MME/SGSN/MSC transmits a trigger information delivery report to the MTC-IWF through the SM-SC.

What described are merely preferable embodiments of the disclosure, and are not intended to limit the disclosure.

INDUSTRIAL APPLICABILITY

In technical solutions of the disclosure, an MTC-IWF which has received trigger information about an MTC device transmits to a subscribed serving network element a request for acquiring routing information of the MTC device; the subscribed serving network element returns information of a serving core network node of the MTC device to the MTC-IWF; the MTC-IWF forwards the trigger information about the MTC device to the serving core network node of the MTC device through an SMS core network node; the serving core network node of the MTC device transmits the trigger information to the MTC device; and the protocol conversion needed in above process is implemented by the MTC-IWF and/or a dedicated IWF and/or an SMS router. Technical solutions of the disclosure make it possible to implement transmission of trigger information through a T4 interface and establish a process of conversion between an MAP protocol and a Diameter protocol.

What is claimed is:

1. A method for trigger information transmission and protocol conversion, comprising:
   transmitting, by a Machine Type Communication Inter Working Function (MTC-IWF) which has received trigger information about a Machine Type Communication (MTC) device, a request for acquiring routing information of the MTC device to a subscribed serving network element;
   returning, by the subscribed serving network element, information of a serving core network node of the MTC device to the MTC-IWF;
   forwarding, by the MTC-IWF, the trigger information about the MTC device to the serving core network node of the MTC device through a Short Messaging Service (SMS) core network node;
   transmitting, by the serving core network node of the MTC device, the trigger information to the MTC device; and
   implementing, by the MTC-IWF and/or a dedicated IWF and/or an SMS router, protocol conversion needed in above process.

2. The method according to claim 1, wherein the SMS core network node comprises a Short Message Service Center (SM-SC), a Short Messaging Service Gateway Mobile Switching Center (SMS GMSC), an SMS router;
   the serving core network node of the MTC device comprises at least one of a Mobility Management Entity (MME), a Serving GPRS Support Node (SGSN) and a Mobile Switching Center (MSC); and
   the subscribed serving network element is a Home Subscriber Server (HSS) or a Home Location Register (HLR).

3. The method according to claim 2, further comprising:
   when the subscribed serving network element is an HLR and a communication protocol used between the MTC-IWF/dedicated IWF and the HLR is different from a communication protocol used between the MTC-IWF/dedicated IWF and the SMS core network node, converting a communication protocol message of the HLR by the MTC-IWF or the dedicated IWF.

4. The method according to claim 2, further comprising:
   when the subscribed serving network element is an HLR, and a communication protocol used between the MTC-IWF/dedicated IWF and the HLR is different from a communication protocol used between the MTC-IWF/dedicated IWF and a Serving Capability Server (SCS), converting a communication protocol message of the HLR by the MTC-IWF/dedicated IWF.

5. The method according to claim 1, wherein the protocol conversion refers to signaling conversion between a Mobile Application Part (MAP) protocol and a Diameter protocol.

6. The method according to claim 2, wherein the SMS core network node acquires the routing information of the MTC device through one of following ways:
   locally-stored routing information;
   receiving the routing information by the MTC-IWF;
   acquiring the routing information by the subscribed serving network element;
   wherein the acquiring the routing information by the subscribed serving network element comprises:
   after receiving the trigger information about the MTC device from a Serving Capability Server (SCS), forwarding, by the MTC-IWF, the trigger information about the MTC device to the SMS GMSC through the SM-SC;
   transmitting, by the SMS GMSC, a sendRoutingInfoForSM (SRI-for-SM) request message to the HSS or the HLR;
   indicating, by the HSS or the HLR, "SMS in MME" to the SMS GMSC through an SRI-for-SM response message; or forwarding, by the HSS or the HLR, the SRI-for-SM request message to the SMS router, then transmitting, by the SMS router, the routing information of the MTC device to the HSS or the HLR through the SRI-for-SM response message, and then forwarding, by the HSS or the HLR, the routing information of the MTC device to the SMS GMSC through the SRI-for-SM response message; or notifying, by the HSS or the HLR, the SMS GMSC of the information of the serving core network node of the MTC device through the SRI-for-SM response message so as to indicate "SMS in MME".

7. The method according to claim 6, wherein when the routing Information of the MTC device is acquired by the SMS router, and a communication protocol used between the SMS GMSC and the HSS or the HLR is different from a communication protocol used between the HSS or the HLR and the SMS router, conversion between MAP and Diameter of the HSS or the HLR is implemented by the SMS router.

8. The method according to claim 6, wherein the indicating "SMS in MME" to the SMS GMSC through an SRI-for-SM response message comprises:
   the SRI-for-SM response message including at least information below: an MME number, MME register as MSC for SMS, and PS-only.

9. The method according to claim 6, wherein the transmitting the trigger information to the MTC device according to the routing information comprises:
   the routing information being the information of the serving core network node of the MTC device; and
   transmitting, by the SMS GMSC, the trigger information about the MTC device to the MTC device through a core network node by way of a short message according to the routing information acquired.

10. A system for trigger information transmission and protocol conversion, comprising a Machine Type Communication Inter Working Function (MTC-IWF), a Machine Type Communication (MTC) device, a Short Messaging Service (SMS) core network node, a serving core network node, an IWF and a subscribed serving network element, wherein the MTC-IWF is configured to receive trigger information about the MTC device and transmit a request for acquiring routing information of the MTC device to the subscribed serving network element;

the subscribed serving network element is configured to return information of the serving core network node of the MTC device to the IWF;

the MTC-IWF is further configured to forward the trigger information about the MTC device to the serving core network node of the MTC device through the SMS core network node;

the serving core network node is configured to transmit the trigger information to the MTC device; and the MTC-IWF and/or a dedicated IWF and/or an SMS router are configured to implement protocol conversion.

11. The system according to claim 10, wherein the SMS core network node comprises a Short Message Service Center (SM-SC), a Short Messaging Service Gateway Mobile Switching Center (SMS GMSC) an SMS router;

the serving core network node of the MTC device comprises at least one of a Mobility Management Entity (MME), a Serving GPRS Support Node (SGSN) and a Mobile Switching Center (MSC); and the subscribed serving network element is a Home Subscriber Server (HSS) or a Home Location Register (HLR).

12. The system according to claim 11, wherein when the subscribed serving network element is an HLR, a communication protocol used between the MTC-IWF/dedicated IWF and the HLR is different from a communication protocol used between the MTC-IWF/dedicated IWF and the SMS core network node; the MTC-IWF or the dedicated IWF is further configured to convert a communication protocol message of the HLR.

13. The system according to claim 11, wherein when the subscribed serving network element is an HLR, a communication protocol used between the MTC-IWF/dedicated IWF and the HLR is different from a communication protocol used between the MTC-IWF/dedicated IWF and a Serving Capability Server (SCS); the MTC-IWF or dedicated IWF is further configured to convert a communication protocol message of the HLR.

14. The system according to claim 12, wherein the protocol conversion refers to signaling conversion between a Mobile Application Part (MAP) protocol and a Diameter protocol.

15. The system according to claim 11, wherein the SMS core network node acquires the routing information of the MTC device through one of following ways:

locally-stored routing information;
receiving the routing information by the MTC-IWF;
acquiring the routing information by the subscribed serving network element;
wherein the acquiring the routing information by the subscribed serving network element, comprises:
after receiving the trigger information about the MTC device from a Serving Capability Server (SCS), the MTC-IWF forwards the trigger information about the MTC device to the SMS GMSC through the SM-SC;
the SMS GMSC transmits a sendRoutingInfoForSM (SRI-for-SM) request message to the HSS or the HLR;
the HSS or the HLR indicates "SMS in MME" to the SMS GMSC through an SRI-for-SM response message; or the HSS or the HLR forwards the SRI-for-SM request message to the SMS router, then the SMS router transmits the routing information of the MTC device to the HSS or the HLR through the SRI-for-SM response message, then the HSS or the HLR forwards the routing information of the MTC device to the SMS GMSC through the SRI-for-SM response message; or the HSS or the HLR notifies the SMS GMSC of the information of the serving core network node of the MTC device through the SRI-for-SM response message so as to indicate "SMS in MME".

16. The system according to claim 15, wherein when the HSS or the HLR acquires the routing Information of the MTC device through the SMS router, and a communication protocol used between the SMS GMSC and the HSS or the HLR is different from a communication protocol used between the HSS or the HLR and the SMS router, the SMS router is further configured to implement signaling conversion between MAP and Diameter of the HSS or the HLR.

17. The method according to claim 3, wherein the protocol conversion refers to signaling conversion between a Mobile Application Part (MAP) protocol and a Diameter protocol.

18. The method according to claim 3, wherein the SMS core network node acquires the routing information of the MTC device through one of following ways:

locally-stored routing information;
receiving the routing information by the MTC-IWF;
acquiring the routing information by the subscribed serving network element;
wherein the acquiring the routing information by the subscribed serving network element comprises:
after receiving the trigger information about the MTC device from a Serving Capability Server (SCS), forwarding, by the MTC-IWF, the trigger information about the MTC device to the SMS GMSC through the SM-SC;
transmitting, by the SMS GMSC, a sendRoutingInfoForSM (SRI-for-SM) request message to the HSS or the HLR;
indicating, by the HSS or the HLR, "SMS in MME" to the SMS GMSC through an SRI-for-SM response message; or forwarding, by the HSS or the HLR, the SRI-for-SM request message to the SMS router, then transmitting, by the SMS router, the routing information of the MTC device to the HSS or the HLR through the SRI-for-SM response message, and then forwarding, by the HSS or the HLR, the routing information of the MTC device to the SMS GMSC through the SRI-for-SM response message; or notifying, by the HSS or the HLR, the SMS GMSC of the information of the serving core network node of the MTC device through the SRI-for-SM response message so as to indicate "SMS in MME".

19. The system according to claim 13, wherein the protocol conversion refers to signaling conversion between a Mobile Application Part (MAP) protocol and a Diameter protocol.

20. The system according to claim 12, wherein the SMS core network node acquires the routing information of the MTC device through one of following ways:

locally-stored routing information;
receiving the routing information by the MTC-IWF;
acquiring the routing information by the subscribed serving network element;
wherein the acquiring the routing information by the subscribed serving network element, comprises:
after receiving the trigger information about the MTC device from a Serving Capability Server (SCS), the MTC-IWF forwards the trigger information about the MTC device to the SMS GMSC through the SM-SC;

the SMS GMSC transmits a sendRoutingInfoForSM (SRI-for-SM) request message to the HSS or the HLR;

the HSS or the HLR indicates "SMS in MME" to the SMS GMSC through an SRI-for-SM response message; or the HSS or the HLR forwards the SRI-for-SM request message to the SMS router, then the SMS router transmits the routing information of the MTC device to the HSS or the HLR through the SRI-for-SM response message, then the HSS or the HLR forwards the routing information of the MTC device to the SMS GMSC through the SRI-for-SM response message; or the HSS or the HLR notifies the SMS GMSC of the information of the serving core network node of the MTC device through the SRI-for-SM response message so as to indicate "SMS in MME".

* * * * *